United States Patent
Mueller

(12) 
(10) Patent No.: US 7,442,249 B2
(45) Date of Patent: Oct. 28, 2008

(54) CEMENT COMPOSITIONS USEFUL IN OIL AND GAS WELLS

(75) Inventor: T. Dan Mueller, Cypress, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 11/598,382

(22) Filed: Nov. 13, 2006

(65) Prior Publication Data

US 2007/0056477 A1    Mar. 15, 2007

Related U.S. Application Data

(62) Division of application No. 10/605,946, filed on Nov. 7, 2003, now Pat. No. 7,156,173.

(60) Provisional application No. 60/424,751, filed on Nov. 8, 2002.

(51) Int. Cl.
 *C04B 14/06* (2006.01)
(52) U.S. Cl. ............... 106/737; 106/716; 106/724; 106/726; 106/738; 106/823
(58) Field of Classification Search .......... 106/718, 106/737, 724, 823, 716, 726, 738
See application file for complete search history.

(56) References Cited

U.S. PATENT DOCUMENTS

| | | | |
|---|---|---|---|
| 3,376,146 A * | 4/1968 | Mitchell | |
| 4,090,561 A | 5/1978 | Powell | 166/292 |
| 4,556,109 A | 12/1985 | Eilers | 166/295 |
| 4,935,060 A * | 6/1990 | Dingsoyr | 106/719 |
| 5,180,430 A * | 1/1993 | Gartner et al. | |
| 5,263,542 A * | 11/1993 | Brothers | |
| 5,346,550 A * | 9/1994 | Kunzi et al. | 106/709 |
| 5,421,409 A * | 6/1995 | Mueller et al. | |
| 5,447,197 A * | 9/1995 | Rae et al. | |
| 5,696,059 A | 12/1997 | Onan et al. | 507/269 |
| 6,330,917 B2 | 12/2001 | Chatterji et al. | 166/295 |
| 6,729,405 B2 * | 5/2004 | DiLullo et al. | |

FOREIGN PATENT DOCUMENTS

EP     0 347 092 A3    6/1989

(Continued)

OTHER PUBLICATIONS

Dale P. Bentz et al., "*Experimental and Simulation Studies of the Interfacial Zone in Concrete*;" National Institute of Standards and Technology, 1991; vol. 22, No. 5, pp. 891-902.

(Continued)

*Primary Examiner*—Paul Marcantoni
(74) *Attorney, Agent, or Firm*—Howrey LLP

(57) ABSTRACT

Cement compositions containing low reactivity materials are disclosed. The compositions are useful in conditions involving high temperatures, high pressures, and tectonic forces such as oil and gas wells. The cement compositions display increased compressive strength, flexural strength, and tensile strength. Fractures appear to occur in a non-linear fashion between the Interfacial Transition Zone (ITZ) of the particles, rather than in a straight line such as those observed in conventional cement materials.

19 Claims, 4 Drawing Sheets

FOREIGN PATENT DOCUMENTS

| EP | WO 90/11977 | 4/1990 |
| EP | 0 621 247 A3 | 4/1994 |
| EP | WO 01/87796 A1 | 5/2001 |
| GB | 2 062 605 A | 11/1979 |
| GB | WO 02/83590 A3 | 4/2002 |

OTHER PUBLICATIONS

K. Vivekanandam et al.; *Transition Zone in High Performance Concrete During Hydration*; Cement and Concrete Research, 1997, vol. 27, No. 6, pp. 817-823.

K.J. Goodwin et al.; "*Cement Sheath Stress Failure*;" SPE 20453, 1990, pp. 495-508.

W. Deeg et al., "*How Foamed Cement Advantages Extend to Hydraulic Fracturing Operations*;" Production Technology, World Oil 1999, 4 pages.

Dan Mueller; "*An Evaluation of Well Cements for Use in High Stress Environments*;" Hart's Petroleum Engineer International, Apr. 1998, pp. 91, 93.

Phil Rae et al., "*Cement Design Using a Computer Model to Predict Zonal Isolation*;" SPE/GSTT-WC06, pp. 1-12.

Gino di Lullo et al., "*Cements for Long Term-Design Optimization by Computer Modelling and Prediction*," IADC/SPE 62745, 7 pages.

M.J. Thiercelin, et al., "*Cement Design Based on Cement Mechanical Response*;" SPE 38598, 1997, pp. 1-23.

K.L. Scrivener et al., "*The Percolation of Pore Space in the Cement Paste/Aggregate Interfacial Zone of Concrete*;" vol. 26, No. 1, pp. 35-40.

R.R. Hengst et al., "*Fracture of Foamed Portland Cements*;" Cement and Concrete Research, vol. 13, pp. 127-134, 1983.

T. Budi Aulia, et al.; "*Effect of Mechanical Properties of Aggregate on the Ductility of High Performance Concrete*;" LACER No. 4, 1999, pp. 133-148.

G. Appa Rao and B.K. Raghu Prasad, Indian Institute of Science and University of Tirupati, India, "*Fracture Properties and Size Effect in HPC*;" 3 pages.

D.P. Bentz (2000), "*Fibers, Percolation, and Spalling of High Performance Concrete*;" ACI Materials Journal, http://www.bfrl.nist.gov/862/vcctl/software/hcss/firefiber/acicolor1.htm, printed Jun. 28, 2002, 13 pages.

D.P. Bentz (1997), "*Three-Dimensional Computer Simulation of Portland Cement Hydration and Microstructure Development*;" J. Am. Ceram. Soc. 80, pp. 3-21.

M. Thiercelin et al., (1998) "*A Soil Mechanics Approach to Predict Cement Sheath Behavior*;" SPE/ISRM 47375, pp. 329-337.

W.W. Fleckenstein, et al., (2001), "*Burst-Induced Stresses in Cemented Wellbores*;" SPE Drilling & Completion, pp. 74-80, 82.

J. D. McLennan et al., (2002); "*Some Advances in Near Wellbore Geomechanics*;" SPE/ISRM 78194, pp. 1-13.

Examination Opinion for GB Patent Application GB0326166.6; Apr. 29, 2004.

Search Report Under Section 17 for GB Patent Application GB0326166.6; Apr. 28, 2004.

\* cited by examiner

CEMENT COMPOSITIONS USEFUL IN OIL AND GAS WELLS

CROSS REFERENCE TO RELATED APPLICATIONS

The present application claims priority to U.S. Provisional Patent Application Ser. No. 60/424,751 filed Nov. 8, 2002, the contents of which are incorporated herein by reference. This application is a divisional application of U.S. patent application Ser. No. 10/605,946, filed Nov. 7, 2003, which is incorporated by reference herein in its entirety.

FIELD OF THE INVENTION

The invention relates to novel cement compositions and, more specifically, to cement compositions that are suitable for the high temperature, high pressure conditions commonly found in oil and gas wells. In particular, highly resilient cement compositions having improved mechanical properties are disclosed.

DESCRIPTION OF RELATED ART

Cement is commonly used seal the wellbore of oil and gas wells. The downhole conditions of wells pose extreme conditions for the cement, exposing it to high temperatures, high pressures, and variable tectonic forces. These conditions frequently lead to the formation of fractures in the concrete, and ultimately failure and collapse of the cement. This damage decreases the production of the well, and may require treatment of the well to repair or replace the cement.

Cementing is a common technique employed during many phases of wellbore operations. For example, cement may be employed to isolate or secure various casing strings and/or liners in a well. In other cases, cementing may be used in remedial operations to repair casing and/or to achieve formation isolation. In still other cases, cementing may be employed during well abandonment. Cement operations performed in wellbores under high stress conditions may present particular problems, among other things, difficulty in obtaining good wellbore isolation and/or maintaining mechanical integrity of the wellbore over the life of the well. These problems may be exacerbated in those cases where wellbore and/or formation conditions promote fluid intrusion into the wellbore, including intrusion of water, gas, or other fluids.

In a wellbore, cement may be used to serve several purposes. Among these purposes are to selectively isolate particular areas of a wellbore from other areas of the wellbore. For example, cement is commonly placed in the annulus created between the outside surface of a pipe string and the inside formation surface or wall of a wellbore in order to form a sheath to seal off fluid and/or solid production from formations penetrated by the wellbore. This isolation allows a wellbore to be selectively completed to allow production from, or injection into, one or more productive formations penetrated by the wellbore. In other cases cement may be used for purposes including, but not limited to, sealing off perforations, repairing casing leaks (including leaks from damaged areas of the casing), plugging back or sealing off the lower section of a wellbore, sealing the interior of a wellbore during abandonment operations, and so on.

The economic success of a drilling operation often hinges upon the ability to establish zonal isolation within a cemented wellbore. Once established, maintaining this zonal isolation is typically impacted by the particular stress environment found while the well is being completed and produced. During the life of a well, the cement sheath may be exposed to stresses imposed by well operations including perforating, hydraulic fracturing, high temperature-pressure differentials, and so on. Further, if the well is completed using a complex completion such as a multi-lateral system, the cement sheath may be subject to shattering and subsequent loss of bond due to pipe impact.

Conventional well cement compositions are typically brittle when cured. These conventional cement compositions often fail due to stresses, such as radial and/or tangential stresses, that are exerted on the set cement. Wellbore cements may be subjected to radial and tangential stresses that result from a variety of causes. For example, stress conditions may be induced by relatively high temperatures and/or relatively high fluid pressures encountered inside cemented wellbore pipe strings during operations such as perforating, stimulation, injection, testing, production, and so on. Stress conditions may also be induced or aggravated by fluctuations or cycling in temperature or fluid pressures during similar operations. Variations in temperature and internal pressure of the wellbore pipe string may result in radial and longitudinal pipe expansion and/or contraction which tends to place stress on, among other things, the annular cement sheath existing between the outside surface of a pipe string and the inside formation surface or wall of a wellbore. Such stresses may also be induced in cement present in other areas of the wellbore in the pipe.

In other cases, cements placed in wellbores may be subjected to mechanical stress induced by vibrations and impacts resulting from operations, for example, in which wireline and pipe conveyed assembly are moved within the wellbore. Hydraulic, thermal and mechanical stresses may also be induced from forces and changes in forces existing outside the cement sheath surrounding a pipe string. For example, overburden and formation pressures, formation temperatures, formation shifting, formation compaction, etc. may cause stress on cement within a wellbore.

Conventional wellbore cements typically react to excessive stress by failing. "Cement failure" refers to cracking, shattering, debonding from attached surfaces (such as exterior surfaces of a pipe string and/or the wellbore face), or otherwise losing its original properties of strength and/or cohesion. Stress-induced cement failure typically results in loss of formation isolation and/or loss of wellbore mechanical integrity, such as casing collapse or shearing of the casing. This in turn may result in loss of production, loss of the wellbore, pollution, and/or hazardous conditions.

Although hydraulic, thermal and/or mechanical induced stresses may be encountered in all types of wells, including those having conventional vertical wellbores, such stresses may be more likely to occur in particular types of completion configurations. For example, completions having relatively thin annular cement sheaths between pipe strings and/or between the outside surface of a pipe string and the inside formation wall may be particularly susceptible to stress-induced cement damage. Such thin cement sheaths may be encountered, for example, in conditions where open hole wellbore size is limited, yet a cemented pipe string diameter must be maximized. Examples include those cases where full length, tieback, or scab liners are cemented, for example, to isolate casing damage and/or substantially eliminate formation pressure and/or fluid communication.

In other cases, a main or primary wellbore may have one or more secondary wellbores extending laterally therefrom to form a lateral or multi-lateral completion. In such cases, a primary wellbore may be vertical or deviated (including horizontal), and one or more secondary lateral wells are drilled from the primary wellbore after it has been cased and cemented. Each of the secondary lateral wellbores may be vertical or deviated, and may optionally include a cemented liner, which may be tied into the primary wellbore. In this regard, secondary lateral wellbores may be drilled from a primary wellbore initially, and/or at any other time during the life of the well. Such lateral or multi-lateral completions may be particularly susceptible to stress induced cement failures for a number of reasons. For example, the juncture between the primary and secondary lateral wellbores is typically exposed to mechanical stresses induced by a large number of subsequent operations involving the running of tools through the junction point. The number of operations and exposure to stress typically increases with the number of secondary lateral wellbores extending from the primary wellbore. Furthermore, the magnitude of mechanical stress from a given operation typically increases with the angle of deviation between the axis of the primary wellbore and the a given secondary lateral wellbore.

When conventional cements are employed in lateral or multi-lateral wellbore completions, the set conventional cement is typically too brittle to withstand shocks and impacts generated by drilling and other well operations performed in the secondary lateral wellbores. Therefore, in such completions, conventional set cement compositions typically fail by shattering or cracking, resulting in loss of isolation and mechanical integrity. Potential for such stress-induced cement failure typically increases, for example, in those situations in which the internal diameter of a cased secondary lateral wellbore is designed to be as close as possible to the internal diameter of the cased primary wellbore. This is typically done for ease of drilling and completion, but results in a cement sheath having a reduced thickness, and therefore which is more susceptible to damage.

Similar cement failure problems may be encountered in single wellbores having relatively thin cement sheaths (such as "slimhole" completions), and/or other configurations which cause an increase in the magnitude of frequency of mechanical stresses including wellbores having deviations or doglegs at which mechanical impact may be concentrated. Examples of such wellbores include highly deviated or horizontal completions, and/or sidetracked wellbores.

In other cases, injection or production of high temperature fluids may cause thermal expansion of trapped fluids located, for example, between a pipe string and a cement sheath, between a cement sheath and the formation, and/or within the cement sheath. Such trapped fluids may create excessive pressure differentials when heated and/or cooled, resulting in cement failure. Thermal cycling (such as created by intermittent injection or production of fluids that are very warm or cool relative to the formation temperature), typically increase the likelihood of cement failure.

In still other cases, mechanical and/or hydraulic forces exerted on the exterior of a cement sheath may cause stress-induced cement failure. Such forces include overburden pressures, formation shifting, and/or exposure to overpressured fluids within a formation. Increased pressure differential, such as may be caused when the interior of a cemented pipe string is partially or completely evacuated of liquid, also tends to promote cement failure, especially when combined with relatively high pressures exerted on the exterior of a cement sheath surrounding the cemented pipe string. Pressure changes may also be the result of natural formation pressure depletion or hydraulic fracturing operations.

In addition, any type of thermal, mechanical or hydraulic stress that acts directly on a set cement composition, or which tends to cause deformation of a wellbore tubular in contact with a set cement composition may promote, or result in, failure of a conventional cement composition.

Furthermore, types of cement configurations that may be adversely affected by stresses, such as those discussed above, include not only annular cement sheaths placed by circulation, but also include cement compositions introduced into a wellbore by a variety of other methods. Such other methods include those employed during or after completion, for example, as part of remedial, workover or abandonment operations. Specific examples include cement placed by squeezing or spotting, to for example, seal off perforations or casing leaks. Presence of high perforation densities may also contribute to cement failure before or after perforation, by explosive force and/or by mechanically weakening a pipe string or tubular so that it is more susceptible to deformation by stress. Such cement configurations may be particularly susceptible to mechanical damage.

In exploring methods to improve the strength of cement compositions, the civil engineering literature has extensively discussed the presence of an "Interfacial Transition Zone" of up to 50 micrometers around aggregates in concrete. Essentially, this is a zone that is characterized as being calcium silicate poor, calcium hydroxide rich, and having a high porosity. These porosity structures are commonly viewed to be the "weak link" in concrete regarding its mechanical properties and durability. ITZ formation is at least in part believed to be due to a "one sided" growth effect of the hydrated calcium silicates hydrates against the non-reactive boundary of the aggregate found in concrete ("wall effect").

Modifications of the ITZ have been reported with the goal of reducing or eliminating the ITZ. These modifications include reducing the width of the ITZ, or reducing the porosity gradient of the ITZ relative to the bulk material. The addition of silica fume to concrete results in ITZs that are nearly as dense as the bulk paste. This is believed to be due to the small size and reactivity of the silica fume particles allowing packing more closely to the aggregate surface and reducing the one sided growth effect. Similar reductions in the width of the ITZ have been discussed using fly ash and rice husk ash.

While the civil engineering community has been focusing at least in part on reducing or eliminating the ITZ as a method of improving the strength of cement structures, there still exists a need for improved cement compositions suitable for use in high temperature, high pressure conditions such as those found in downhole well environments.

SUMMARY OF THE INVENTION

Cement compositions suitable for use in the extreme conditions of oil and gas wells are disclosed. The compositions optimize the properties of the ITZ layer and have improved mechanical properties relative to conventional cement compositions. The compositions preferably contain low reactivity materials with sizes of about 40 microns to about 250 microns. Non-linear fractures occur in the cement, rather than the linear fractures observed in conventional cement. The cement compositions can be used in oil and gas wells, as well as in the construction of other cement and concrete structures.

DESCRIPTION OF THE FIGURES

The following figures form part of the present specification and are included to further demonstrate certain aspects of the present invention. The invention may be better understood by reference to one or more of these figures in combination with the detailed description of specific embodiments presented herein.

DETAILED DESCRIPTION OF THE INVENTION

Figure 1:
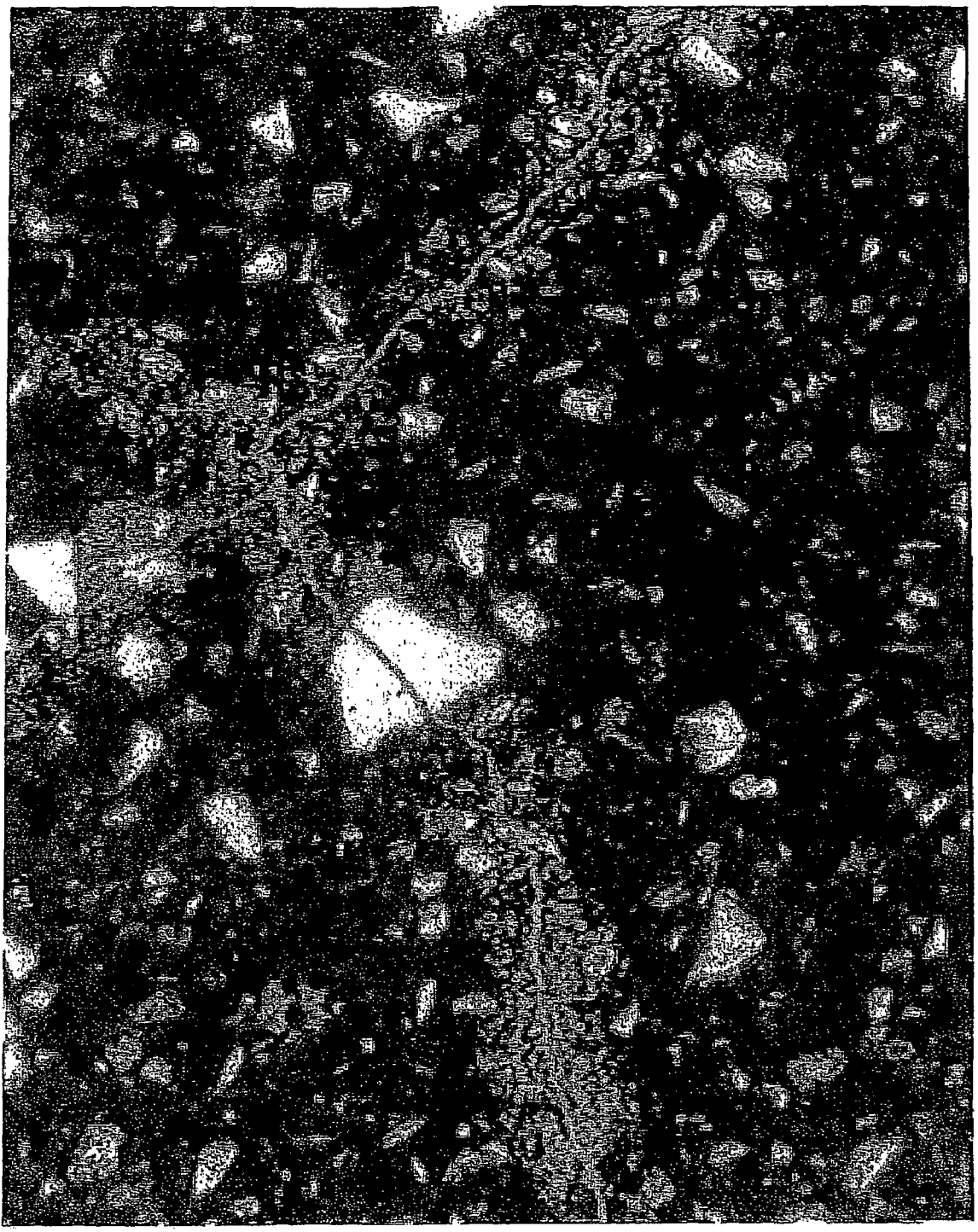
FIG. 1 shows the linear fracture observed in a conventional cement composition. The fracture passes directly through a large particle.

Novel cement compositions are disclosed. The compositions can be used in downhole oil and gas well applications, as well as in conventional construction applications. The compositions are especially attractive for use in environments that experience high temperature, high pressure, and tectonic forces.

While compositions and methods are described in terms of "comprising" various components or steps, the compositions and methods can also "consist essentially of" or "consist of" the various components and steps.

Cement Compositions

One embodiment of the invention is directed towards cement compositions. The compositions can be dry (prior to the addition of water) or wet (after the addition of water). The compositions generally comprise cement and low reactivity particles.

The cement can generally be any type of Portland cement. The cement can generally be of any API specification Class such as A, B, C, G, or H. Examples of commercially available cements include Lafarge Class H, Dyckerhoff Class G, and Cemex Class C. ASTM specification cements such as I, II, III, IV, and V can also be used. Other suitable hydraulic cements include commercial lightweight cements such as TXI Lightweight can be used. Other cementitious materials such as ground granulated blast furnace slag, Class C or Class F fly ash, pozzolan microspheres, or ceramic microspheres may also be included in the cement compositions.

The low reactivity particles can generally be any low reactivity material, such as silica sand ($SiO_2$), aluminum silicates, other minerals, gilsonite (resinous hydrocarbon), ground coal, adamantanes, fullerenes. Particle sizes are often determined by a "mesh" number. Numbers correlate to a screen or mesh having that number of openings per square inch. For example, a 20 mesh screen has 20 openings per square inch, while a 325 mesh screen has 325 openings per square inch. The higher the number, the smaller the size of the openings. The size of the particles is preferably about 40 mesh to about 250 mesh (i.e. most of the materials pass through a 40 mesh screen but are larger than a 250 mesh screen). Specific examples of particle sizes include about 40 mesh, about 50 mesh, about 100 mesh, about 150 mesh, about 200 mesh, about 250 mesh, and ranges between any two of these values. The weight percent of the low reactivity particles based on the weight of the cement can be about 30% to about 100%. Specific examples of the weight percent include about 30%, about 40%, about 50%, about 60%, about 70%, about 80%, about 90%, about 100%, and ranges between any two of these values.

The water can generally be added in any amount sufficient to form a pumpable slurry. Generally, the water can be about 30% to about 150% by weight based on the weight of the cement. Specific examples of the weight percent include about 30%, about 40%, about 50%, about 60%, about 70%, about 80%, about 90%, about 100%, about 110%, about 120%, about 130%, about 140%, about 150%, and ranges between any two of these values.

The cement compositions can further comprise additives such as dispersants, salts, set retarders, gas control agents, free fluid control agents (such as biopolymers), weighting materials (such as hematite), fluid loss agents (such as hydroxyethylcellulose and AMPS copolymers), bonding agents (such as polyvinyl alcohol), extenders (such as sodium montmorillonite, sodium metasilicate, sodium silicate, and the like), reinforcing agents, and gels. Reinforcing agents can include wollastonite, pyrophyllite, sepiolite, carbon whiskers, polypropylene whiskers, and nylon whiskers.

Figure 2:
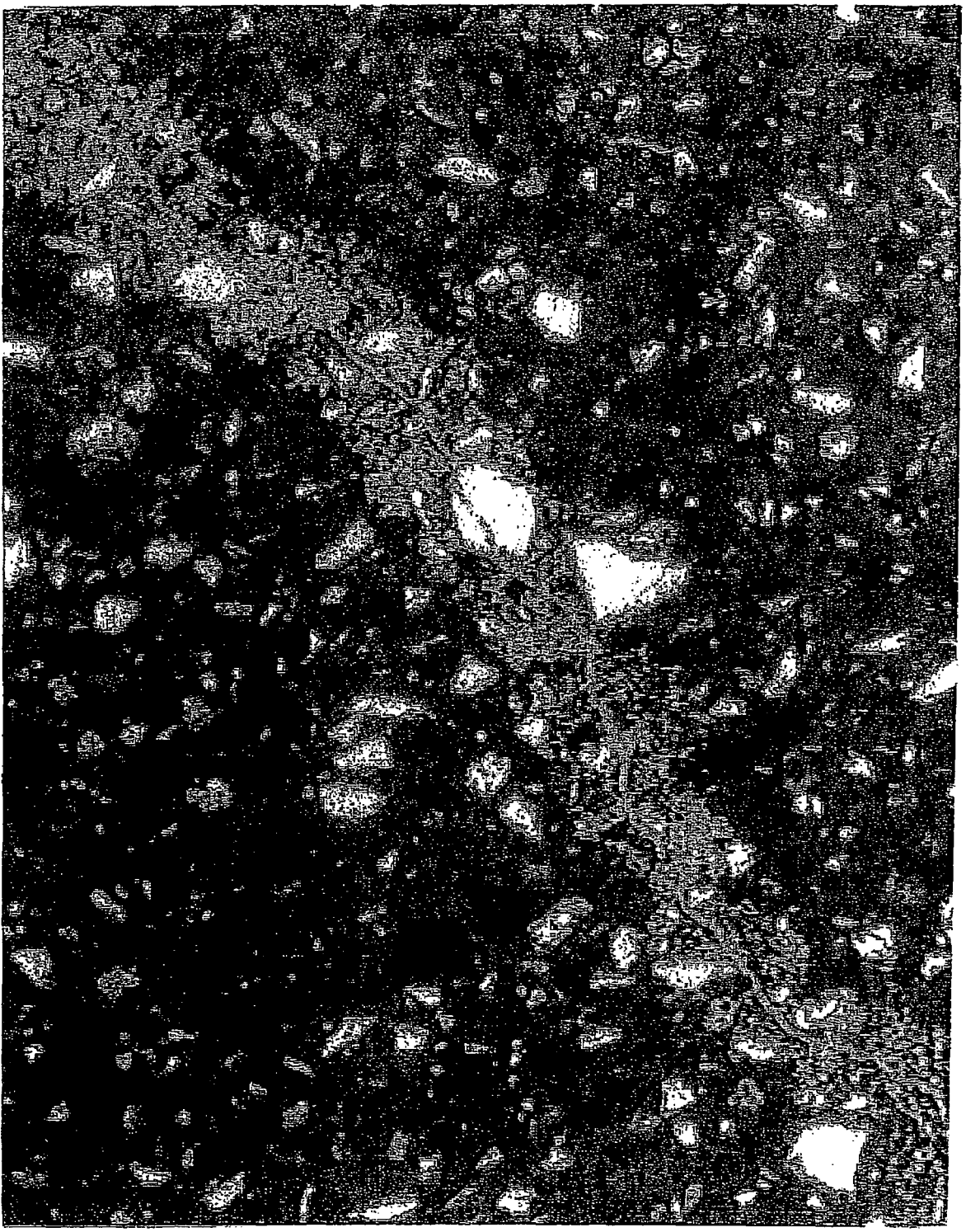
FIG. 2 shows the linear fracture observed in a conventional cement composition. The fracture passes directly through a large particle.
Figure 3:
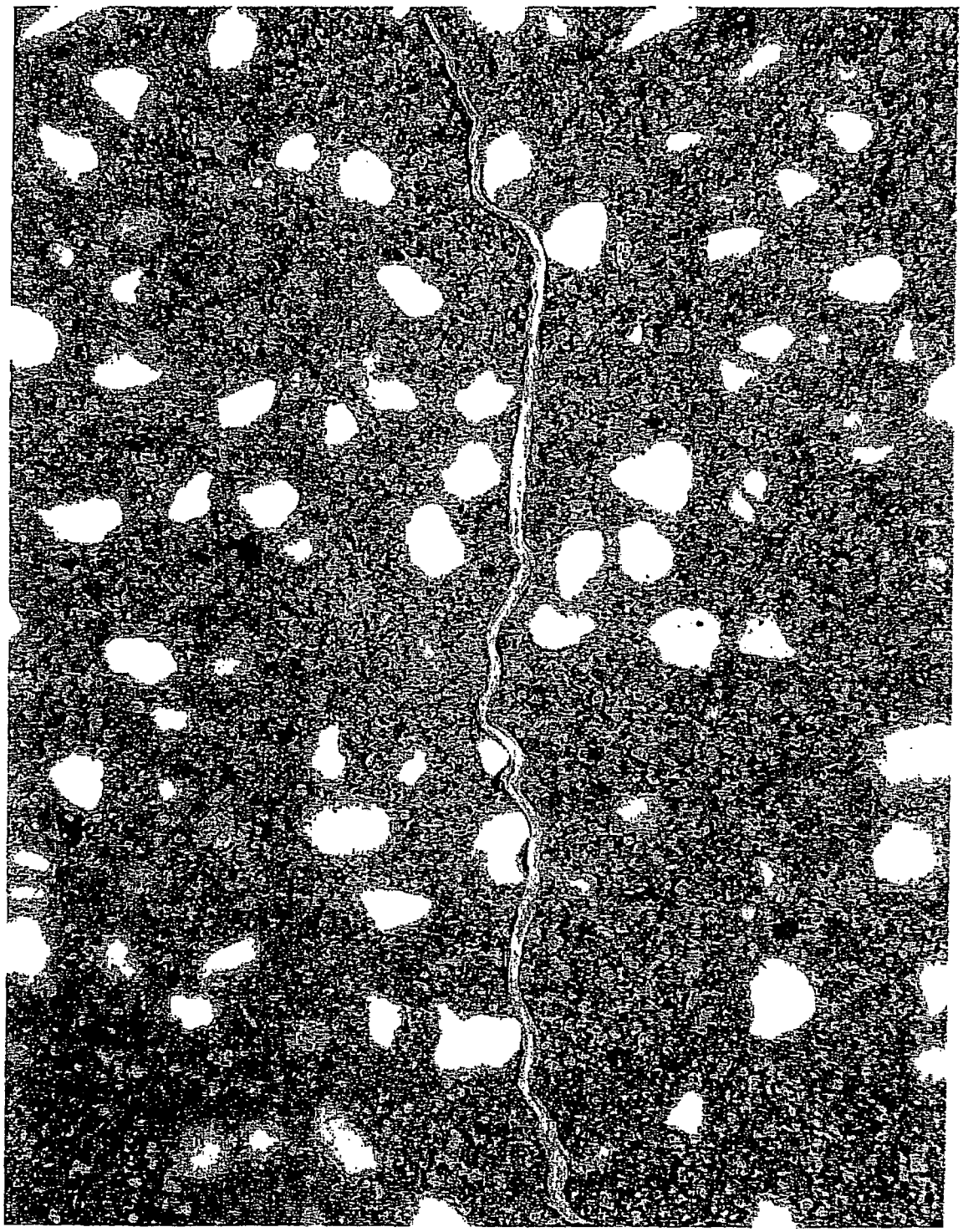
FIG. 3 shows the non-linear fracture observed in an inventive cement composition. The fracture appears to pass from ITZ to ITZ.
Figure 4:
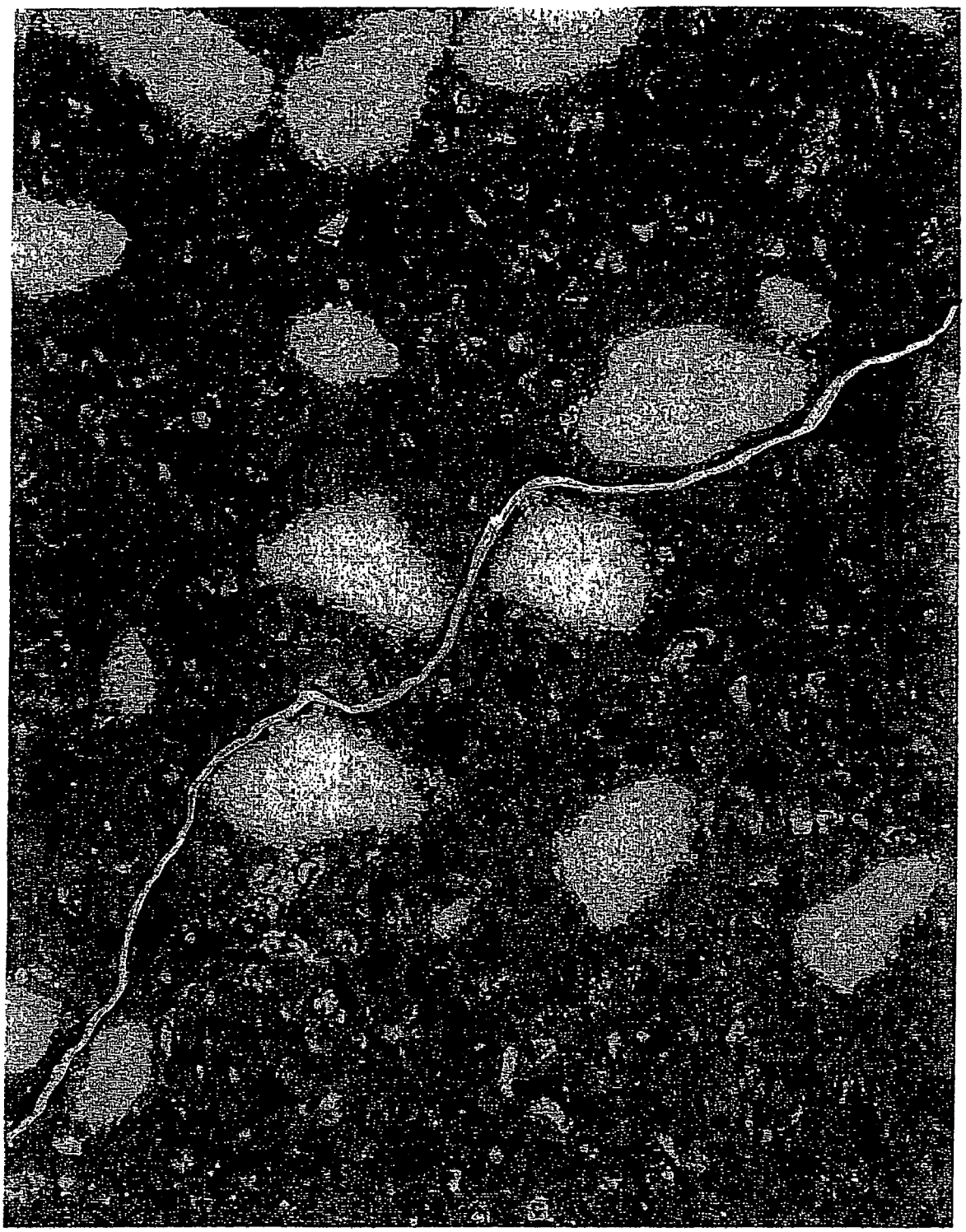
FIG. 4 shows the non-linear fracture observed in an inventive cement composition. The fracture appears to pass from ITZ to ITZ.

It has been observed that the inventive cement compositions, when set, fracture in a manner different from conventional cement compositions. Conventionally, fractures occur in a roughly linear manner (FIGS. 1 and 2). These linear fractures often cut through large particles found in the composition. In contrast, the inventive compositions have been observed to fracture in a non-linear fashion, going from particle boundary to particle boundary (apparently from ITZ to ITZ) (FIGS. 3 and 4).

Methods of Use

The above described cement compositions can be used in methods to prepare cement or concrete structures. The cement compositions can be mixed with water or a water based fluid to prepare a slurry, and cast into a wide array of shapes and structures. Sand, gravel, or other solid materials can be added to the cement compositions to prepare a slurry.

A presently preferred embodiment involves methods of using the above described compositions in cementing in oil and gas wells. The cement compositions can be mixed with water or a water based fluid to prepare a slurry, and the slurry can be introduced into a wellbore by pumping or other methods. The mixing and introducing steps can be performed in a batch or continuous fashion. The slurry would preferably be allowed to set within the wellbore for a sufficient time.

The above described cement compositions can also be used to prepare other cement or concrete structures such as buildings, bridges, roads, driveways, columns, marine structures, and so on.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLES

Example 1

Materials and Methods

Lafarge cement is commercially available from Lafarge North America Inc. (Herndon, Va.). Dyckerhoff cement is produced by Dyckerhoff AG (Wiesbaden, Germany). Cemex C cement is commercially available from Cemex Company (Odessa, Tex.). Joppa H cement is commercially available from Lafarge's Joppa Illinois plant. TXI Lightweight cement is commercially available from Texas Industries Incorporated (Midlothian, Tex.). BA-11 is a bonding agent commercially available from BJ Services Company (Houston, Tex.). FL-63 is a fluid loss additive commercially available from BJ Services Company. R-8 is a set retarder commercially available from BJ Services Company.

Cements are commonly referred to by an API specification class. The class is assigned based upon, among other characteristics, the percentage of water in the cement. Class A has 46%, B has 46%, C has 56%, G has 44%, and H has 38%. S-8 is a silica flour with 200-325 mesh. S-8C is a more course silica flour with 70-200 mesh. CD-32 is a cement dispersant commercially available from BJ Services (Houston, Tex.). Gel is sodium montmorillonite available as BJ Gel (BJ Services, Houston, Tex.).

Cement samples were prepared in accordance with API Recommended Practice 10B, 22nd edition, December 1997.

Unless indicated otherwise, percentages of cement composition components discussed herein are weight percentages based on the weight of cement. For example, 35% S-8 refers to an addition of 35 pounds S-8 per 100 pounds of cement (since cement is sold in 94 pound sacks, 32.9 pounds of S-8 would be added to each sack). The concentration "Lbm/gal" stands for pounds mass per gallon.

Compressive strength was measured by the destructive method named API Recommended Practice 10B, 22nd edition, December 1997. Flexural strength was measured by methods contained in ASTM C 348. The upper detection limit for measuring flexural strength was 2045 psi. Tensile strength was measured by the methods contained in ASTM C 190-85. The upper detection limit for measuring tensile strength was 884 psi.

Example 2

Comparison of Dyckerhoff G Cement Containing Either S-8 or S-8C

Various cement compositions were prepared containing Dyckerhoff G cement, either S-8 or S-8C, CD-32 dispersant, and water. The density (Lbm/gal), compressive strength, flexural strength, and tensile strength of the resulting samples were determined. Values were determined at 300° F. (149° C.). The following tables shows the compositions and test values of the samples.

| Sample | Silica | CD-32 | Water | Density (Lbm/gal) |
|---|---|---|---|---|
| 1 | 35% S-8 | 0.2% | 44% | 16.73 |
| 2 | 35% S-8C | 0.1% | 44% | 16.73 |
| 3 | 60% S-8C | 0.4% | 44% | 17.23 |
| 4 | 83.7% S-8C | 0.2% | 44% | 17.63 |
| 5 | 100% S-8C | 0.4% | 44% | 17.86 |

| Sample | CS (Psi) | FS (Psi) | TS (Psi) | FS/CS ratio | TS/CS ratio |
|---|---|---|---|---|---|
| 1 | 10375 | 1236 | 420 | 0.119 | 0.041 |
| 2 | 4541 | 1002 | 581 | 0.22 | 0.127 |
| 3 | 8213 | 1759 | 682 | 0.214 | 0.083 |
| 4 | 10750 | >2045* | >884* | 0.190 | 0.082 |
| 5 | 13125 | >2045* | 722 | 0.155 | 0.055 |

*The value exceeded the upper detection limit of the assay.

Substitution of S-8 (200-325 mesh) with the larger S-8C (70-200 mesh) had significant effects on compressive strength, flexural strength, and tensile strength. At higher concentrations of S-8C, compressive strength and flexural strength were increased relative to control Sample #1. At all concentrations of S-8C, tensile strength was increased relative to control Sample #1. Samples 1-5 were tested at a fixed water concentration, but the densities varies owed to the densification effects of the S-8C.

Example 3

Addition of Gel to Cement Compositions

Three samples were prepared adding varying amounts of gel to a cement composition containing 83.7% S-8C. The density (Lbm/gal), compressive strength, flexural strength, and tensile strength of the resulting samples were determined. Values were determined at 300° F. (149° C.). The following table shows the compositions and test values of the samples, and compares them to Sample 4 (containing 83.7% S-8C but lacking gel).

| Sample | Gel | CD-32 | Water | Density (Lbm/gal) |
|---|---|---|---|---|
| 4 | 0 | 0.2% | 44% | 17.63 |
| 6 | 6% | 0.55% | 78% | 15.5 |
| 7 | 16% | 0.6% | 136% | 13.6 |
| 8 | 24% | 0.7% | 182% | 12.75 |

| Sample | CS (Psi) | FS (Psi) | TS (Psi) | FS/CS ratio | TS/CS ratio |
|---|---|---|---|---|---|
| 4 | 10750 | >2045* | >884* | 0.190 | 0.082 |
| 6 | 6125 | 1432 | 289 | 0.233 | 0.047 |
| 7 | 1600 | 286 | 108 | 0.178 | 0.067 |
| 8 | 775 | 250 | 75 | 0.333 | 0.096 |

*The value exceeded the upper detection limit of the assay.

Lowering the density by the addition of gel and additional water reduced the density, compressive strangth, flexural strength, and tensile strength.

Example 4

Evaluation of the Effects of the Absence of Silica on Dyckerhoff G Cement

Dyckerhoff G concrete samples were prepared containing or lacking silica, but with all other components held constant. The density (Lbm/gal), compressive strength, flexural strength, and tensile strength of the resulting samples were determined. Values were determined at 200° F. (93° C.).

| Sample | Silica | CD-32 | Water | Density (Lbm/gal) |
|---|---|---|---|---|
| 9 | 83.7% S-8C | 0.2% | 44% | 17.62 |
| 10 | 0 | 0.1% | 44% | 15.8 |

| Sample | CS (Psi) | FS (Psi) | TS (Psi) | FS/CS ratio | TS/CS ratio |
|---|---|---|---|---|---|
| 9 | 5937 | 1943 | 675 | 0.327 | 0.113 |
| 10 | 8250 | 1922 | 531 | 0.232 | 0.064 |

The addition of silica reduced the compressive strength, maintained the flexural strength at approximately the same value, and increased the tensile strength of the product.

Example 5

Evaluation of Lafarge H Cement

Various cement compositions were prepared containing Lafarge Class H cement, either S-8 or S-8C, CD-32 dispersant, and water. The density (Lbm/gal), compressive strength, flexural strength, and tensile strength of the resulting samples were determined. Values were determined at 300° F. (149° C.). The following table shows the compositions and test values of the samples.

| Sample | Silica | CD-32 | Water | Density (Lbm/gal) |
|---|---|---|---|---|
| 11 | 35% S-8 | 0.2% | 38% | 17.33 |
| 12 | 35% S-8C | 0.1% | 38% | 17.34 |
| 13 | 83.7% S-8C | 0.2% | 38% | 18.18 |

| Sample | CS (Psi) | FS (Psi) | TS (Psi) | FS/CS ratio | TS/CS ratio |
|---|---|---|---|---|---|
| 11 | 6362 | 490 | 658 | 0.077 | 0.103 |
| 12 | 4393 | 880 | 436 | 0.200 | 0.099 |
| 13 | 8250 | 1790 | 781 | 0.216 | 0.094 |

Substitution of S-8 (200-325 mesh) with the larger S-8C (70-200 mesh) had significant effects on compressive strength, flexural strength, and tensile strength. At higher concentratons of S-8C, compressive strength and tensile strength were increased relative to control Sample #11. At all concentrations of S-8C, flexural strength was significantly increased relative to control Sample #11.

Example 6

Evaluation of the Effects of the Absence of Silica on Lafarge H Cement

Lafarge H cement samples were prepared containing or lacking silica, but with all other components held constant. The density (Lbm/gal), compressive strength, flexural strength, and tensile strength of the resulting samples were determined. Values were determined at 200° F. (93° C.).

| Sample | Silica | CD-32 | Water | Density (Lbm/gal) |
|---|---|---|---|---|
| 14 | 83.7% S-8C | 0.1% | 38% | 18.17 |
| 15 | 0 | 0.1% | 38% | 16.46 |

| Sample | CS (Psi) | FS (Psi) | TS (Psi) | FS/CS ratio | TS/CS ratio |
|---|---|---|---|---|---|
| 14 | 7531 | 1912 | 661 | 0.253 | 0.087 |
| 15 | 7122 | 1775 | 435 | 0.249 | 0.061 |

The addition of silica increased the compressive strength, flexural strength, and tensile strength of the product.

Example 7

Evaluation of Cemex C Cement

A sample was prepared containing Cemex Class C cement, S-8C silica, dispersant, and water. The density (Lbm/gal), compressive strength, flexural strength, and tensile strength of the sample was determined. Values were determined at 300° F. (149° C.).

| Sample | Silica | CD-32 | Water | Density (Lbm/gal) |
|---|---|---|---|---|
| 16 | 83.7% S-8C | 0.1% | 56% | 16.7 |

| Sample | CS (Psi) | FS (Psi) | TS (Psi) | FS/CS ratio | TS/CS ratio |
|---|---|---|---|---|---|
| 16 | 3375 | 895 | 621 | 0.265 | 0.184 |

Example 8

Evaluation of TXI Lightweight Cement

Samples were prepared containing TXI Lightweight cement, S-8C silica, dispersant, and water. Sample 19 also contained 1.2% BA-11 (polyvinyl alcohol), 1% FL-63 (AMPS/based fluid loss additive), and 0.5% R-8 (lignosulfonate based cement retarder). The density (Lbm/gal), compressive strength, flexural strength, and tensile strength of the sample were determined. Values were determined at 300° F. (149° C.).

| Sample | Silica | CD-32 | Water | Density (Lbm/gal) |
|---|---|---|---|---|
| 17 | 94% S-8C | 0 | 74.6% | 15.3 |
| 18 | 94% S-8C | 0.3% | 61.1% | 16.0 |
| 19 | 94% S-8C | 0.3% | 59.7% | 16.0 |

| Sample | CS | FS | TS | FS/CS ratio | TS/CS ratio |
|---|---|---|---|---|---|
| 17 | 3750 | 1827 | 375 | 0.487 | 0.100 |
| 18 | nd | 1656 | 409 | | |
| 19 | nd | 961 | 426 | | | nd = not determined.

These three samples show the effects of additives and changing densities of the system. Addition of BA-11, FL-63, and R-8 reduced flexural strength, and essentially did not change tensile strength.

Example 9

Evaluation of LaFarge Type I/II Cement

Samples were prepared containing LaFarge Type I/II cement, S-8C silica, gel, dispersant, and water. All samples contained 83.7% S8-C. Samples 22 and 23 additionally contained 2% calcium chloride (by weight of cement). Calcium chloride is a commonly used cement accelerator. The density (Lbm/gal), compressive strength, flexural strength, and tensile strength of the sample was determined. Values were determined at 170° F. (77° C.) for samples 20 and 21, and at 80° F. (27° C.) for samples 22 and 23.

| Sample | Gel | CD-32 | Water | Density (Lbm/gal) |
|---|---|---|---|---|
| 20 | 16% | 0.2% | 136% | 13.6 |
| 21 | 24% | 0.3% | 182% | 12.7 |
| 22 | 16% | 0.4% | 136% | 13.6 |
| 23 | 24% | 0.6% | 182% | 12.7 |

| Sample | CS (Psi) | FS (Psi) | TS (Psi) | FS/CS ratio | TS/CS ratio |
|---|---|---|---|---|---|
| 20 | 4500 | 327 | 85 | 0.072 | 0.018 |
| 21 | 3800 | 143 | 80 | 0.037 | 0.021 |
| 22 | 662 | 306 | 68 | 0.462 | 0.102 |
| 23 | 370 | 102 | 40 | 0.275 | 0.108 |

This table shows the effects of lowering the densities of the samples at various temperatures. The results indicate a higher FS/CS and TS/CS ratio for the designs containing calcium chloride that were cured at 80° F. (27° C.) while the compressive strengths were generally much lower than those produced at 170° F. (77° C.), even with the addition of the calcium chloride accelerator.

| Sample | Silica | CD-32 | Water | Density (Lbm/gal) |
|---|---|---|---|---|
| 24 | 35% S-8 | 0.2% | 44% | 16.73 |
| 25 | 35% S-8C | 0.1% | 44% | 16.73 |
| 26** | 60% S-8 | 0.6% | 44% | 17.23 |
| 27 | 60% S-8C | 0.4% | 44% | 17.23 |
| 28** | 83.7% S8 | 0.6% | 44% | 17.63 |
| 28 | 83.7% S-8C | 0.4% | 44% | 17.63 |

**Denotes not slurry mixable under field conditions, results for comparison only.

| Sample | CS (Psi) | FS (Psi) | TS (Psi) | FS/CS ratio | TS/CS ratio |
|---|---|---|---|---|---|
| 24 | 10375 | 1236 | 420 | 0.119 | 0.040 |
| 25 | 4541 | 1002 | 581 | 0.220 | 0.127 |
| 26** | 14625 | 1139 | 750 | 0.077 | 0.051 |
| 27 | 8213 | 1759 | 682 | 0.214 | 0.083 |
| 28** | 14373 | 1227 | 750 | 0.085 | 0.052 |
| 28 | 13125 | >2045* | >884* | >0.155 | >0.067 |

**Denotes not slurry mixable under field conditions, results for comparison only.

This table shows the results of a direct comparison of performance between silica sand (S-8C) and silica flour (S-8). The designs containing S-8C exhibited more favorable FS/CS and TS/CS ratios. Note the slurries containing 60% and 83.7% silica flour (S-8) are not mixable under field conditions. Several minutes were required to mix the cement in the laboratory for sample testing. Results are for comparison only.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the methods described herein without departing from the concept and scope of the invention. More specifically, it will be apparent that certain agents which are chemically related may be substituted for the agents described herein while the same or similar results would be achieved. All such similar substitutes and modifications apparent to those skilled in the art are deemed to be within the scope and concept of the invention.

What is claimed is:

1. A cement composition comprising cement and low reactivity particles,
    wherein the low reactivity particles have a size of about 40 mesh to about 250 mesh, and
    wherein the low reactivity particles are present at a concentration of about 30 weight percent to about 100 weight percent, based on the weight of the cement.

2. The composition of claim 1, wherein the composition fractures in a non-linear manner when set.

3. The composition of claim 1, wherein the cement is API Class A cement, API Class B cement, API Class C cement, API Class G cement, or API Class H cement.

4. The composition of claim 1, wherein the cement is ASTM class I cement, ASTM class II cement, ASTM class III cement, ASTM class IV cement, or ASTM class V cement.

5. The composition of claim 1, wherein the particles are silica sand.

6. The composition of claim 1, wherein the particles are aluminum silicate, gilsonite, ground coal, adamantane, or fullerene.

7. The composition of claim 1, further comprising water.

8. The composition of claim 7, wherein the water is present at a concentration of about 30 weight percent to about 150 weight percent, based on the weight of the cement.

9. The composition of claim 1, further comprising sand.

10. The composition of claim 1, further comprising gravel.

11. The composition of claim 1, further comprising a dispersant, a salt, a set retarder, a gas control agent, a free fluid control agent, a biopolymer, a weighting material, a fluid loss agent, a bonding agent, an extender, a reinforcing agent, or a gel.

12. The composition of claim 11, wherein the weighting agent is hematite.

13. The composition of claim 11, wherein the fluid loss agent is a hydroxyethylcellulose and AMPS copolymer.

14. The composition of claim 11, wherein the bonding agent is polyvinyl alcohol.

15. The composition of claim 11, wherein the extender is sodium montmorillonite, sodium metasilicate, or sodium silicate.

16. The composition of claim 11, wherein the reinforcing agent is wollastonite, pyrophyllite, sepiolite, carbon whiskers, polypropylene whiskers, or nylon whiskers.

17. A cement composition comprising:
cement; and
silica sand having a size of about 40 mesh to about 250 mesh, and
wherein the silica sand is present at a concentration of about 30 weight percent to about 100 weight percent, based on the weight of the cement.

18. The composition of claim 17, further comprising water.

19. The composition of claim 17, further comprising water at a concentration of about 30 weight percent to about 150 weight percent, based on the weight of the cement.

* * * * *